(12) United States Patent
Yerazunis et al.

(10) Patent No.: US 7,158,167 B1
(45) Date of Patent: Jan. 2, 2007

(54) VIDEO RECORDING DEVICE FOR A TARGETABLE WEAPON

(75) Inventors: William S. Yerazunis, Acton, MA (US); Darren L. Leigh, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/150,360

(22) Filed: Sep. 9, 1998

Related U.S. Application Data

(63) Continuation-in-part of application No. 08/906,493, filed on Aug. 5, 1997.

(51) Int. Cl.
   *H04N 7/18* (2006.01)
   *G11B 5/00* (2006.01)

(52) U.S. Cl. ............................................. 348/61; 360/5

(58) Field of Classification Search .................. 348/61, 348/143, 151; 360/5, 6; 386/46, 117
See application file for complete search history.

(56) References Cited

U.S. PATENT DOCUMENTS

| | | | |
|---|---|---|---|
| 4,348,277 A * | 9/1982 | Cowlin et al. ............... 209/705 |
| 4,630,911 A * | 12/1986 | Paul ............................ 396/426 |
| 4,835,621 A * | 5/1989 | Black ........................... 386/118 |
| 4,955,812 A * | 9/1990 | Hill ............................. 434/16 |
| 5,026,158 A * | 6/1991 | Golubic ....................... 356/252 |
| 5,294,978 A * | 3/1994 | Katayama .............. 375/240.12 |
| 5,342,054 A * | 8/1994 | Chang ......................... 473/156 |
| 5,400,185 A * | 3/1995 | Scerbo ......................... 360/5 |
| 5,499,049 A * | 3/1996 | Esfandiari ................... 348/143 |
| 5,546,124 A * | 8/1996 | Scerbo ......................... 348/158 |
| 5,815,205 A * | 9/1998 | Hashimoto .................. 348/373 |
| 5,845,165 A * | 12/1998 | McMahan .................... 396/426 |
| 5,845,240 A * | 12/1998 | Fielder ......................... 704/201 |
| 5,930,493 A * | 7/1999 | Ottesen et al. ................ 725/92 |

(Continued)

FOREIGN PATENT DOCUMENTS

DE     4127534 A1 *  2/1993

(Continued)

*Primary Examiner*—Mehrdad Dastouri
(74) *Attorney, Agent, or Firm*—Andrew J. Cartin; Dirk Brinkman

(57) ABSTRACT

A compact video image recording device which is mountable to a gun and useful for recording video images before and after the firing of the gun. The recording device includes a camera comprising a lens and a video image sensor. The video recording device is mounted on the gun such that the viewing area of the camera includes the target area of the gun. The video image sensor generates an electronic signal representative of a video image impinging the respective sensor. The output of the image sensor is processed and generally employed to produce frame data which are successively stored in successive frame locations of a semiconductor memory organized as a circular buffer memory while the video recording device is in an active state. Upon the firing of the gun, additional frames are stored in the buffer memory for a short period of time and a portion of the buffer memory is employed to preserve a video record of the shooting both before and after the event. Additional frames are successively stored in the unused portion of the buffer memory. In the event of a further firing of the gun, an additional portion of the buffer memory is dedicated to preserving the image data associated with subsequent firing incident. This process may be repeated until the buffer memory is full in the event the gun is repeatedly fired. A video record is thus generated which documents the circumstances preceding and following the firing of the gun.

38 Claims, 11 Drawing Sheets

U.S. PATENT DOCUMENTS 5,991,043 A * 11/1999 Andersson et al. ......... 356/400

FOREIGN PATENT DOCUMENTS

| EP | 0 215 130 A | 3/1987 |
| EP | 287964 A * | 10/1988 |
| EP | 0 156 944 A | 10/1997 |
| JP | 09 004999 | 1/1997 |

* cited by examiner

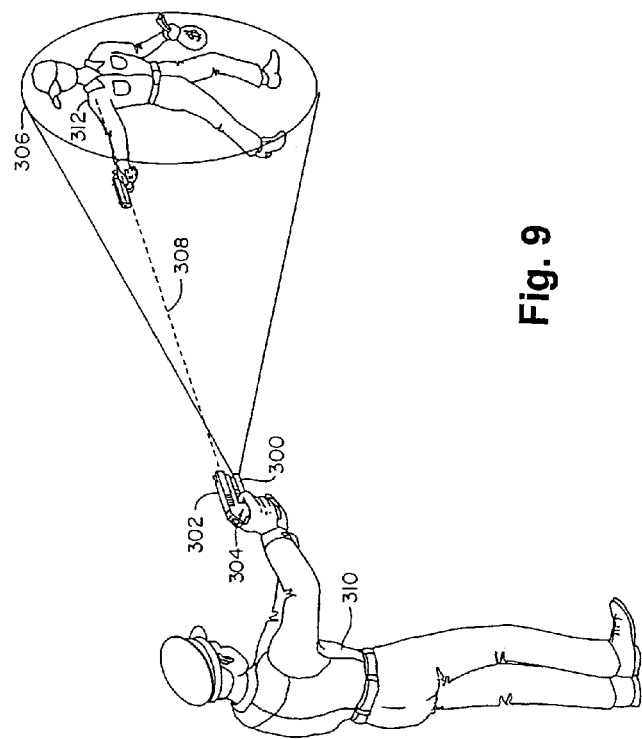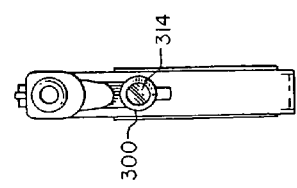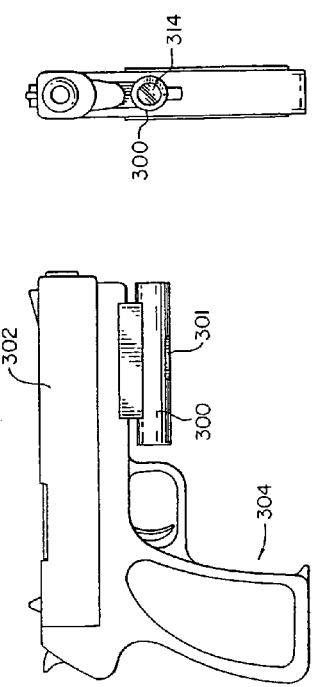

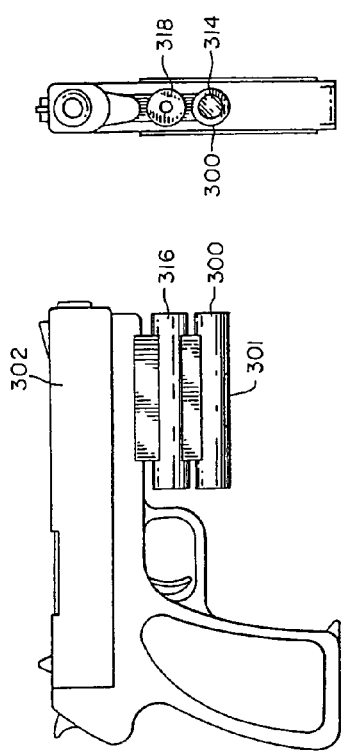
Fig. 11b
Fig. 11a
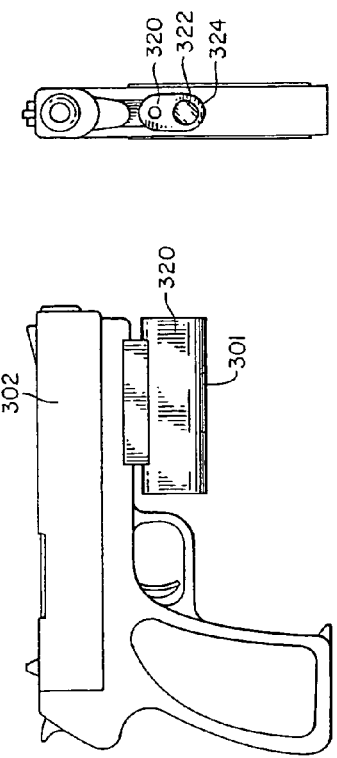
Fig. 12b
Fig. 12a

VIDEO RECORDING DEVICE FOR A TARGETABLE WEAPON

CROSS REFERENCE TO RELATED APPLICATIONS

Continuation-in-part of application Ser. No. 08/906,493, filed Aug. 5, 1997

STATEMENT REGARDING FEDERALLY SPONSORED RESEARCH OR DEVELOPMENT

Not Applicable

BACKGROUND OF THE INVENTION

The present invention relates to video recording devices and more particularly to a video recording device which is adapted to store video images corresponding generally to the area surrounding the sighting area of a targetable weapon such as a gun.

Numerous applications exist in which it is desirable to retain a video record for evidentiary or historical purposes. For example, in an automobile, or on a bicycle or motorcycle, it would be desirable to record a video image of the circumstances existing immediately prior to and after an accident. Additionally, in security applications, it would be highly desirable to be able to record a video image of the circumstances existing immediately prior to an event triggering an alert condition and following the triggering of such a condition.

Another example in which it would be desirable to have a recorded video image for evidentiary purposes involves the firing of a lethal or non-lethal targetable weapons such as a gun, TAZER(™) or mace. In the event an individual is injured or killed, for example, by a police officer acting in the line of duty, lawsuits are sometimes filed against the officer and the municipality in which it is asserted that the shooting of the victim was without justification and unlawful. Such suits are typically accompanied by large damage claims. In these circumstances, it would be desirable to have a video record which would show the scene as viewed by the police officer at the time the gun was fired.

Additionally, in numerous other applications it would be desirable to be able to create a video record of circumstances existing both before and after a triggering event.

A number of image recording devices are well known in the art. In time lapse photography a series of still pictures are taken over a period of time. Such pictures are typically taken with a periodically actuated still or a motion picture camera and employ photographic film. The cameras are loaded with a limited supply of film and the camera must be reloaded when the supply of film is exhausted. Accordingly, such devices are not well suited for applications in which it is desired to record images over a long period of time when only a very short period of time is of interest and the particular period of interest cannot be predicted.

In security applications, a video camera is often employed to record a video image on magnetic tape on a continuous basis. When the tape is exhausted it must be replaced.

Both photographic cameras employing photographic film and video cameras utilizing magnetic tape as the recording media employ mechanical transport mechanisms which are susceptible to failure when subjected to shock and vibration. Accordingly, such devices are ill suited for use in applications and environments in which shock and vibration are the norm.

For the above reasons, a video recording device would be desirable which could record video frames on a continuing basis and capture a video record of circumstances surrounding a triggering event occurring at an unpredictable time. It would further be desirable for such a device to be compact, lightweight, cost effective and avoid the aforementioned deficiencies of prior art video recording devices employing mechanical transports.

BRIEF SUMMARY OF THE INVENTION

In accordance with the present invention, a video recording device is disclosed which is contained within a compactly sized housing. One or more video image sensors are mounted to the housing. Alternatively, one or more video image sensors are provided which are electrically coupled to the housing via wires so as to permit the image viewing area to be selected freely via suitable mounting of the sensors by a user. The video recording device records video frames successively in at least one circular buffer memory organized as a continuous loop overwriting the oldest frame within the respective buffer memory with a more recently received frame. Upon receipt of a triggering event, a predetermined number of additional frames are recorded within the circular buffer memory at which point recording ceases. A plurality of circular memory buffer groups may be provided to extend the overall recording time for the device by selectively storing video data samples to the respective buffer groups. The foregoing video recording device can be fabricated as a compact transportable unit which employs no moving parts and which has relatively low power consumption facilitating battery operation in certain embodiments.

More specifically, a video camera is provided which contains a lens and a video image sensor. The lens is employed to focus a video image on a video image sensor such as a charge coupled device sensor or an artificial retina as hereinafter discussed. The output of the video image sensor comprises an analog signal which is coupled to one or more A/D converters. The A/D converter(s) is sampled to generate a digital representation of the video image sensor analog output signal. A predetermined number of digital samples comprise one video frame. The digitized output signal(s) from the A/D converter(s) is coupled to a central controller in the form of a microprocessor or any other suitable controller. The microprocessor compresses the digitized frame data and stores the compressed frame data in the next sequential location of the circular buffer. In one embodiment, the digitized frame data is encrypted prior to storing the same in the buffer so as to prevent unauthorized access to such data. The circular frame buffer comprises a semiconductor memory such as DRAM or any other suitable high speed semiconductor memory.

Upon detection of a trigger event, the video recording device records a predetermined number of additional frames and then ceases to record further frame data. In this manner, a video event record is obtained which commences prior to the triggering event and extends in time after the triggering event. Triggering events may include an accelerometer output signal crossing a predetermined threshold, a signal employed to initiate air bag deployment in an automobile, a signal representing a recognized change in a video image or acoustic signal, a signal indicative of a security or fire alarm condition, a button actuated by a user, or any other suitable activation signal known in the art. Further, an activation button is provided which permits a user to take a single frame "snap shot" which is retained within the buffer memory until purged upon user activation of a purge button.

A serial output channel is provided to permit recorded frame data to be downloaded to a computer for viewing. Alternatively, any appropriate data transfer link and protocol may be employed.

The above described apparatus thus provides a video recording device which has high reliability, is compact, cost effective and suitable both for consumer and commercial applications.

In one application, a video recording device as described above is mounted to a targetable weapon, such as a gun. The video recording device is aligned so as to record images generally surrounding the line of fire of the weapon. When employed in conjunction with a gun, the video recording device may be mounted to the barrel of the gun, may be piggy-backed on a laser targeting device mounted to the gun, or may be combined with a laser targeting device within a single housing. The video recording device commences the recording of video frames upon the removal of the gun from a holster. Video frames are recorded successively in the circular buffer memory. A gun firing signal is generated upon discharge of the gun. The gun firing signal may be generated by an accelerometer or a microphone or alternatively, may comprise a signal generated upon actuation of the trigger of the gun, in which case an interface between the gun and the video recording device, is provided. Upon detection of the firing signal, the video recording device stores additional frames within the circular buffer memory for a short period of time. Upon a firing event, specified frame data associated with that firing event both before and after the event is preserved and cannot be overwritten as a result of further use of the gun or subsequent firing events. Frame data associated with each subsequent firing events is stored within an unused portion of the circular buffer memory. In a preferred embodiment of the invention, fewer video frames are stored for each subsequent firing event.

BRIEF DESCRIPTION OF THE SEVERAL VIEWS OF THE DRAWING

The invention will be more fully understood by reference to the following Detailed Description of the Invention in conjunction with the drawings of which:

FIG. 7 is a table illustrating an alternative storage technique for storage of video data in the semiconductor memory buffer;

FIG. 8 is a table illustrating a further alternative storage technique for storage of video data in the semiconductor memory buffer;

FIG. 9 is a pictorial view illustrating the use of a gun having a video recording device in accordance with the present invention mounted thereto;

FIG. 10A comprises a side view of a gun having a video recording device in accordance with the present invention mounted below the barrel of the gun;

FIG. 10B is a frontal view of the gun and video recording device of FIG. 9A;

FIG. 11A is a side view of a gun having a laser target designator and a video recording device in accordance with the present invention mounted below the barrel of the gun;

FIG. 11B is a frontal view of the gun, laser target designator and video recording device of FIG. 10A;

FIG. 12A is a side view of a gun having a housing containing a laser target designator and a video recording device mounted below the barrel of the gun;

FIG. 12B is a frontal view of the gun and housing of FIG. 11A;

DETAILED DESCRIPTION OF THE INVENTION

Figure 1:
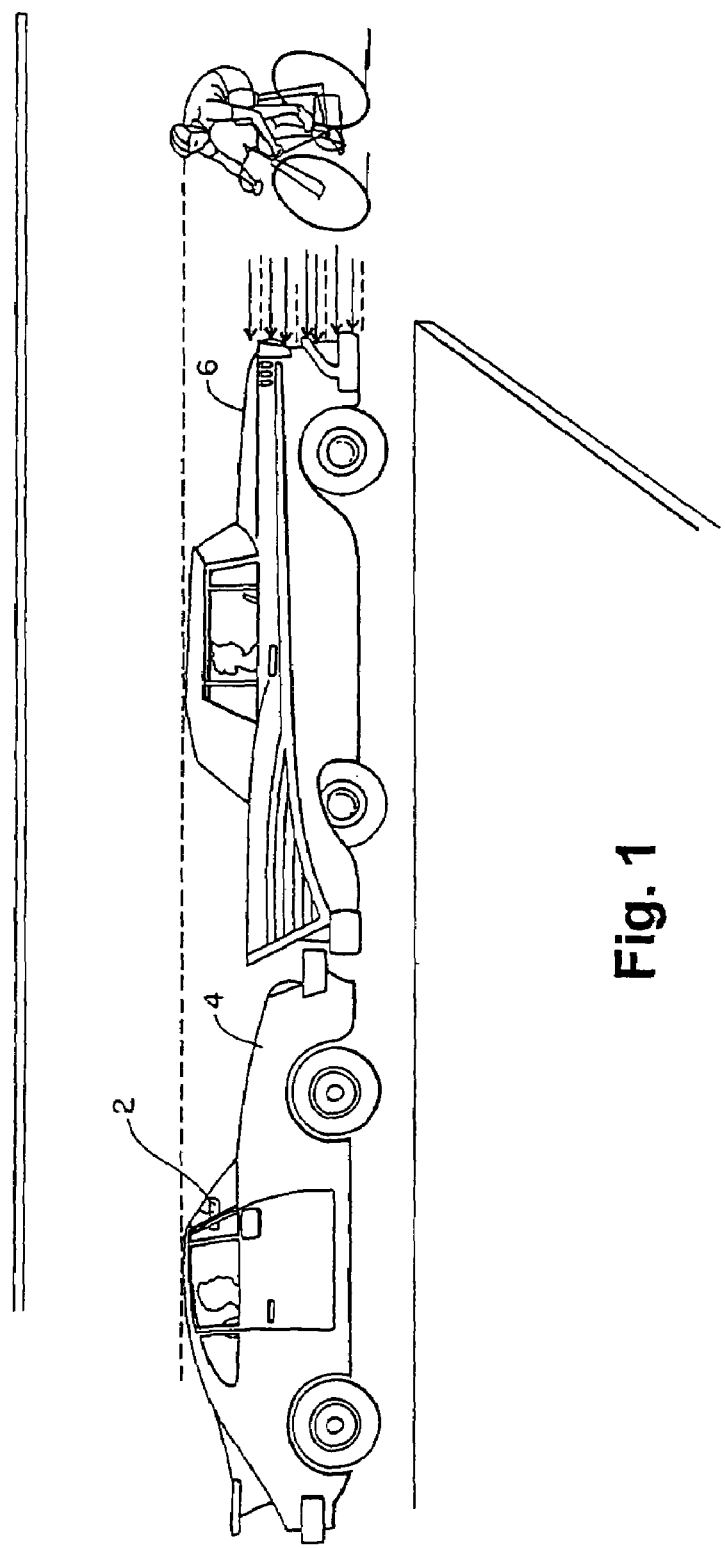
FIG. 1 is a pictorial view illustrating an application for use of the video recording device of the present invention.

An application of a video recording device 2 in accordance with the present invention is illustrated in FIG. 1. The recording device 2 is mounted within a first vehicle 4 which has come to a stop behind a second vehicle 6 at an intersection. Vehicle 6 has also come to a stop at the intersection, however, it has backed up so as to impact vehicle 4 causing damage to vehicle 4. It would be highly desirable for the driver of vehicle 4 to have an evidentiary record which establishes that the accident was caused by vehicle 6 since it would normally be presumed in such a circumstance that the driver of vehicle 4 was the cause of the accident. The video recording device 2 in accordance with the present invention generates such a record by continually recording video frames in a circular buffer at a predetermined frame rate. In response to a trigger event, such as an air bag activation signal or a button activated by the driver, the video recording device records a predetermined number of additional frames before ceasing to record further frames. In the foregoing manner, the driver of vehicle 4 can establish the true cause of the accident. The foregoing example is provided solely as an illustration of the operation of the video recording device 2 of the present invention.

Figure 2A:
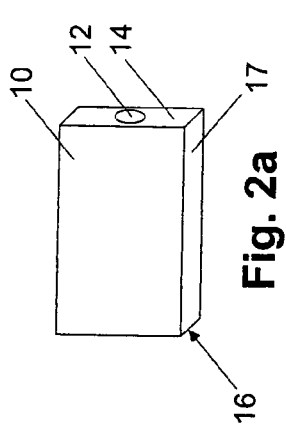
FIG. 2*a* is a pictorial view of a housing for a video recording device in accordance with the present invention in which a camera comprising a lens and image sensor is mounted within the housing.

A housing 10 for a video recording device 2 in accordance with the present invention is depicted in FIG. 2*a*. The housing 10 includes a camera comprising a lens 12 and a video image sensor (not shown) which may comprise a charge coupled device (CCD), an artificial retina, or any other suitable optical sensor operative to provide output signals when a video image impinges the sensor. By way of illustration, the sensor may comprise a model TC241 CCD array manufactured by Texas Instruments or an artificial retina such as identified and described volume 372, number 197 NATURE, 1994 which is incorporated herein by reference. The lens 12 is specified to have appropriate optical characteristics and is oriented so as to focus a video image of the desired field of view on the video image sensor. While the housing of FIG. 2a illustrates the use of a single camera, multiple cameras may be employed and selectively oriented to capture images at desired viewing angles. For example, one camera may be positioned at the forward edge 14 of the housing 10 and a second camera at the trailing edge 16 of the housing 10 to capture images at 180° viewing angles. Additionally, by way of example, cameras may be disposed on the leading edge 14 and a side edge 17 of the housing 10 so as to capture video images along orthogonal viewing angles. It is further understood that any desired number of cameras may be employed.

Figure 2B:
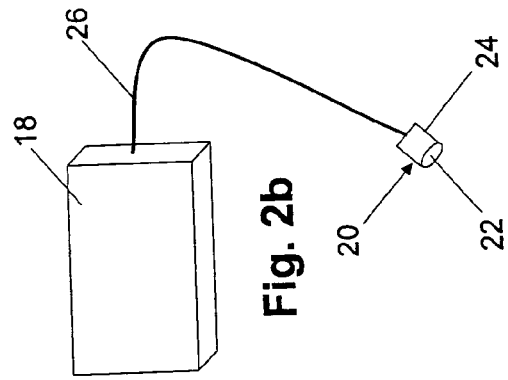
FIG. 2*b* is a pictorial view of an alternative embodiment of a housing for the video recording device of FIG. 1 in which the camera is disposed external to the housing and in electrical communication with video processing circuity (not shown) disposed within the housing.

Another embodiment of a video recording device assembly in accordance with the present invention is depicted in FIG. 2b. The video recording device illustrated in FIG. 2b includes a housing 18 and a camera 20 which is disposed external to the housing 18. The lens 22 focuses a video image on the sensor 24 which, in the preferred embodiment, produces an electrical output signal for communication to a video signal processor. The sensor 24 communicates the electrical output signal via wires 26 to the video signal processor disposed within the housing 18. The wires 26 may be coupled to the circuitry (not shown) via a connector or alternatively may be hardwired to such circuitry. While a single video image sensor 20 is depicted in FIG. 2b, as with respect to FIG. 2a, the video recording device in accordance with the present invention may employ multiple cameras 20 which may be selectively mounted and positioned at desired viewing angles so as to permit a corresponding number of video images to be captured.

The housings illustrated in FIGS. 2a and 2b may be fabricated in a PCMCIA configuration with a PCMCIA connector disposed at one end so as to permit the housing to be inserted into a laptop computer or any other suitable computer having a PCMCIA interface to permit viewing of images captured within the video recording device.

Figure 3:
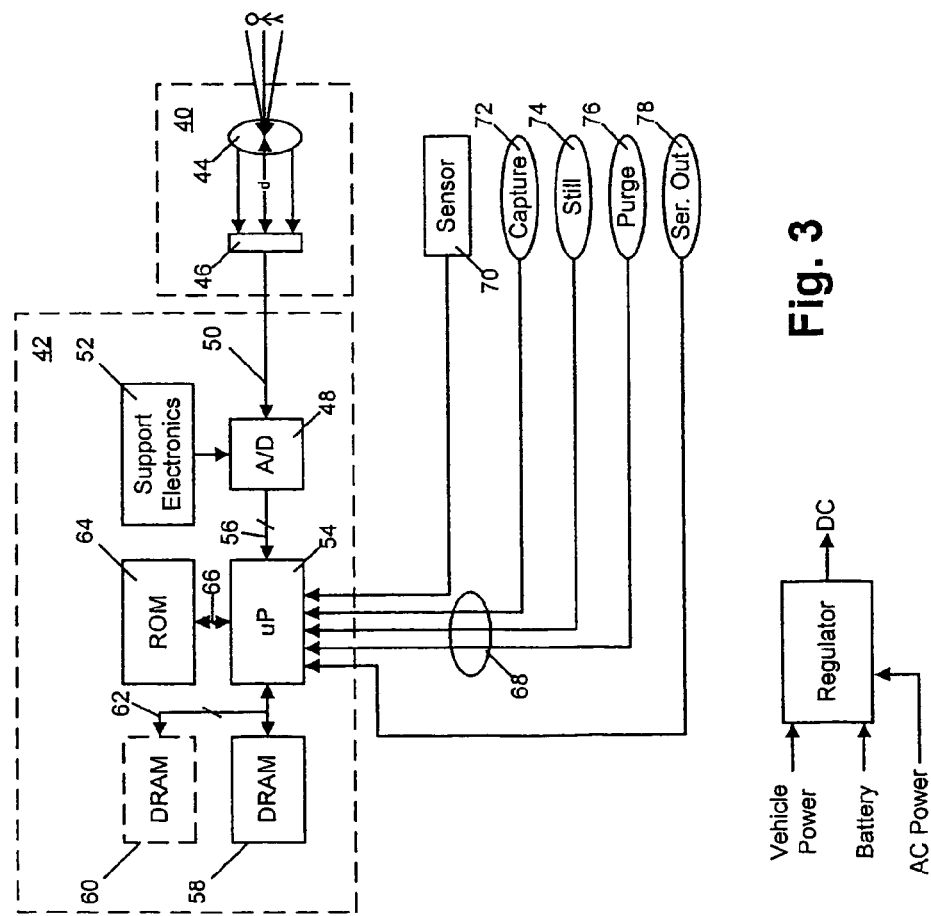
FIG. 3 is an electrical block diagram of a video recording device in accordance with the present invention.

A block diagram of the video recording device in accordance with the present invention is depicted in FIG. 3. As illustrated in FIG. 3, the recording device includes a camera 40 and video electronics 42. The camera 40 is comprised of a lens 44 which is disposed a predetermined distance d from the surface of an image sensor 46. The image sensor 46, as described above, may comprise a charge couple device array, an artificial retina, or any other suitable image sensor operative to provide an output signal representative of a video image which impinges upon the sensor. In a preferred embodiment employing a CCD array as the sensor 46, the CCD array produces an analog output signal which is electrically coupled to an analog to digital converter 48 via a signal path 50. The analog to digital converter may comprise a model AD775 A to D converter manufactured by Analog Devices, Inc. or any other suitable analog to digital converter. Support electronics 52 are provided which include a clock generator which is coupled to the analog to digital converter 48 to permit the sensor output 50 to be sampled at predetermined intervals and other conventional timing circuitry. The analog to digital convertor 48 generates a digital representation of the sensor output signal 50. A predetermined number of samples of the sensor output signal 50 comprise a single video frame. For example, in one exemplary embodiment, each frame contains 256 horizontal samples by 128 vertical samples yielding an uncompressed size of 32,768 bytes. Sixty four such frames can be stored in a two (2) megabyte memory.

Generally, color images require approximately thirty (30) percent more storage space. One could thus store approximately fifty (50) frames of uncompressed color image information in the two (2) megabyte memory.

For images of the above identified sizes a compression ratio of four to one (4:1) is readily achievable. Such would permit 256 black and white images or 200 color images to be stored in the two (2) megabyte memory. At a recording rate of ten (10) frames per second, the two (2) megabyte memory will accommodate thus accommodate 25 seconds of black and white images or 20 seconds of color images. A greater recording interval may be achieved by employing a lower sampling rate or by utilizing a larger memory.

The output of the analog to digital converter is electrically coupled to inputs of a central control processor 54 via signal path 56 which comprises a parallel signal bus. The central control processor 54 in a preferred embodiment, may comprise an M32RD microprocessor which is commercially available from Mitsubishi Electric, any other suitable microprocessor, an Application Specific Integrated Circuit (ASIC) or any other suitable implementation of a central control processor operative to perform the presently described functions.

The central control processor 54 is coupled to a semiconductor memory 58 which comprises a DRAM a in preferred embodiment. Within the M32RD device referenced above, two (2) megabytes of DRAM is incorporated in the commercially available device. Thus the microprocessor 54 and the DRAM 58 may be obtained as a single integrated circuit. Additional semiconductor memory 60 may be coupled to the microprocessor 54 via a bus 62 in the event that it is desired to increase the semiconductor memory capacity of the video recording device. It may be desired to increase the memory capacity of the recording device to permit a greater number of frames to be captured or to accommodate the storage of video images received from plural cameras.

The central control processor 54 executes a control program which is stored within a Read Only Memory (ROM). The ROM 64 is coupled to the central control processor via bus 66. The central control processor 54 may be provided with a number of inputs 68 which permit activation of the video recording device and control of the device by a user. Exemplary inputs comprise, an event sensor 70, a "capture" button 72, a "still" button 74 and a "purge" button 76. Additionally, the central control processor 54 includes a serial output channel 78 which permits stored video images to be downloaded to an external video device for viewing. In one embodiment, the serial output channel is compatible with the well known Xmodem serial protocol. It is appreciated that any suitable serial channel protocol may be employed.

The central control processor 54 receives successive samples of frame data from the analog to digital converter 48 and compresses the received frame data in order to reduce the storage capacity for the captured video data. One image compression technique which may be employed is disclosed in U.S. Pat. No. 4,917,812 to Adelson and Simoncelli. While any suitable compression technique may be employed, in a preferred embodiment of the invention, an asymmetric compression technique (known in the art) is used which minimizes the computational load on the central control processor to compress the image data during compression of the image data at the expense of greater complexity in the decompression algorithm. The use of an asymmetric compression technique thus places greater processing demands on the processor which will ultimately perform the decompression which, is likely to comprise a personal computer (PC), a workstation, or some other computer which generally possesses the necessary processing speed to perform such decompression or which is not burdened by the constraint of real time processing. In this manner, the video electronics 42 are not burdened with additional cost associated with added processing power.

Figure 4A:
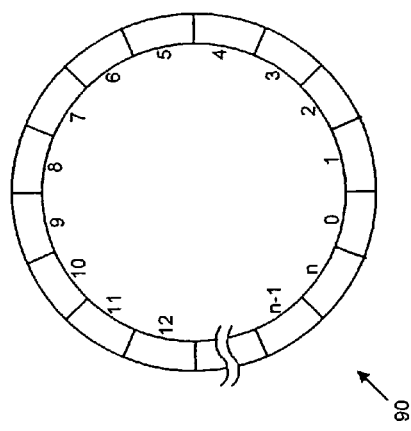
FIG. 4*a* is a simplified schematic representation of a circular memory buffer employed within the video recording device of FIG. 3.

Following the compression of the frame data, the central control processor stores the compressed data within the semiconductor memory 58. The semiconductor memory 58 is structured as a circular memory buffer as illustrated in FIG. 4*a*. Thus, following compression, each compressed video frame is stored in the next successive frame buffer location and any frame data continued in such location is overwritten. For example, referring to FIG. 4*a*, if the last frame were stored at location 3 of the circular buffer 90, the subsequent video frame would be stored at location 4 of the circular frame buffer. The video recording device, absent receipt of some trigger event from the sensor 54 or activation of other input by the user, continues to store captured frame data in successive locations of the circular buffer, overwriting previously received frame data stored in respective buffer locations with the most recently received frame data.

Figure 4B:
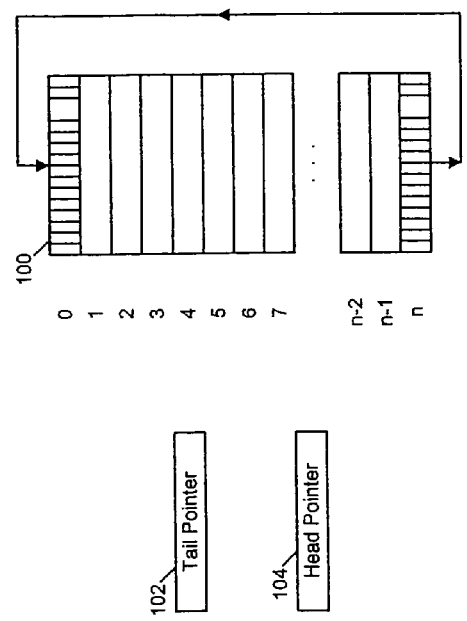
FIG. 4*b* is a representation of a semiconductor memory buffer employed in the video recording device of FIG. 3 to implement a circular memory buffer and associated head and tail pointers.

The operation of the circular buffer is described with more particularity below and with respect to FIG. 4*b*. The semiconductor memory buffer is sized to as to permit the desired number of frames to be concurrently stored in the buffer. The buffer 100 utilizes a plurality of bytes to store each frame as illustrated in frame buffer locations 0 and n. The specific number of bytes required for a particular frame is dependent upon the resolution of the video image sensor 46, the sampling rate of the analog to digital converter 48, and the efficiency of the compression algorithm.

Associated with the semiconductor memory buffer 58 (and additional buffer memory 60 if such is employed) are a tail pointer 102 and a head pointer 104. The head pointer points to the address of the frame buffer location for storage of the next frame data. Such address is offset in the respective frame to address the respective byte for the frame data being stored. For simplicity, the operation of the buffer is explained with respect to the frame addresses recognizing that plural locations are utilized within the buffer to store the data associated with any given frame.

The head pointer 104 points to the location for storage of the incoming frame data. Thus, if the next frame data is to be stored in location 4, the head pointer is set to location 4. Once all of the data corresponding to frame 4 has been stored in the buffer, in normal operation and in the absence of a trigger event, the head pointer is incremented to point to frame number 5. As an example, assume a semiconductor memory buffer 58 is employed in which n=127; i.e. the frame buffer is capable of storing 128 frames of data. It is further assumed for purposes of the present example that it is desired to have half of the captured frames precede the trigger event and half of the frames follow the trigger event. The head pointer 104 is incremented following the storing of each respective frame. In normal operation, the tail pointer is incremented each time the head pointer is incremented, however, the tail pointer comprises an address which lags the head pointer by sixty four. In the circular buffer frame address 0 follows frame address n (i.e. 127 in the present example).

Upon detection of a trigger event, the tail pointer ceases to increment while frames continue to be stored in subsequent frame locations. A test is performed prior to storing frame data to determine whether the frame location for the data to be stored is one location preceding the tail pointer, in which case the frame data pertaining to that frame is stored and no subsequent frames are stored in the frame buffer. Thus, following the trigger event, the buffer contains frame data commencing at a location z and ending at a location z-1; i.e. if the tail pointer stopped incrementing upon detection of a trigger event when pointing to address 6, the last captured video image would be stored in location 5 and further image capture and storage would cease.

The event sensor 70 may comprise any sensor which provides a trigger output signal in response to a condition which is desired to initiate the capture of the video image or images occurring prior to and following the occurrence of the trigger output signal. For example, the sensor 70 may comprise an accelerometer, an air bag deployment sensor of the type normally used in automobiles to initiate the deployment of an air-bag, a security or fire alarm alert condition sensor such as are used to detect movement, glass breakage, or unauthorized entry. The trigger output signal may also be an acoustic signal characteristic of a specific event such as gunshots, or any other signal indicative of a specified event. Moreover, while a single sensor 70 is illustrated for simplicity, it should be appreciated that plural sensors may be employed to activate the capture of video images by the present video recording device and that video image capture may be initiated by any one of such sensors or a combination of such sensors.

Upon detection of a trigger event from the sensor 70, the central control processor 54 receives only a predetermined number of additional frames and stores such frames in the semiconductor memory 58 in the successive frame locations within the circular buffer 90. Following the recording of the predetermined number of additional frames, the video recording devices ceases to record further frame data. Thus, if the central controller is programmed to record half the number of frames which are capable of being stored within the semiconductor memory 58 or 58 and 60, as applicable, the video frame data stored within the circular buffer corresponds to an equal number of video frames captured prior to the trigger event and after the trigger event. It is appreciated that any desired percentage of frames may be captured prior to or after the trigger event by specifying how many frames are to be captured and stored after the trigger event.

In one preferred embodiment, it is envisioned that the semiconductor memory will support the storage of 5 frames of video data per second for approximately 30 seconds. Thus, the memory will support the storage of approximately 150 video frames. If it is desired to record the same number of frames before and after detection of a trigger event from sensor 70, seventy five additional frames would be recorded and stored in the circular buffer 90 subsequent to the detection of the trigger event. It should be appreciated that the number of frames that are recorded before and after are a matter of design choice, the only limitation being that the total number of frames to be recorded not exceed the frame capacity of the semiconductor memory. Thus, in the above example in which the video electronics include DRAM supporting storage of 150 video frames, if it was desired to obtain a record which provided ten percent of the frame data prior to the trigger event and ninety percent of the frame data following the trigger event, an additional 135 frames would be recorded and stored subsequent to the trigger event.

Referring again to FIG. 3, the video electronics 42 and sensor 46 are powered by a DC regulator which may derive input power from an AC source, when such is available, from a vehicle battery, or from batteries such as AA cells or any other suitable batteries. When powered by a vehicle battery, it is recognized that in the event of an accident or in some cases, when the vehicle is turned off, the vehicle battery power may cease to provide power. In such event, the battery cells provide an alternative source of power to permit the buffers 58 and 60 to be periodically refreshed (should DRAMs be employed). Since the refresh current is extremely low for DRAMs, the data captured within the buffer may be maintained for many weeks before the captured video data is lost. It is estimated that two or four AA cells will support full operation of the video recording device for between two and five hours of recording operation thus permitting fully portable operation of the unit on, for example, a bicycle or in any other application if a steady source of power is not readily available, at a minimal cost in added weight. It is also estimated that two (2) to (4) AA battery cells will maintain the contents within memory for between one (1) and (4) months.

The video recording device is provided with a capture button 72 which serves as a user activatable trigger event. Thus, a user of the device may initiate video capture by pushing the capture button 72. Upon activation of the capture button, a trigger signal is provided to and detected by the central control processor 54. The operation of the video electronics 42 upon user activation of the capture button 72 is otherwise as described with respect to the occurrence of a trigger event in response to a trigger signal provided by the sensor 70.

The still button 74 is optionally provided and coupled to the central control processor 54. Upon activation of the still button, the video electronics captures a video frame and stores the frame within the buffer memory 58 or the extended buffer memory 60. In one embodiment, a frame which is stored as a result of the activation of the still button 74 is stored in a protected memory buffer area which is not employed as a part of the circular buffer 90. In another embodiment of the video recording device, the captured frame is stored within a frame location within the circular buffer, however, the frame is protected from overwriting while video capture within the circular buffer continues. Such may be accomplished via tagging protected frame locations containing captured still frames and checking to determine whether a frame location is protected prior to writing to the frame location. Alternatively, a "still" frame may be stored at the upper, lower or some other designated portion end of the circular buffer and the head and tail pointers controlled so as not to result in the overwriting of the "still" frame.

The purge button 76 is optionally provided and is electronically coupled to the central control processor 54. Upon activation of the purge button, the contents of the circular buffer and any still images that have been captured are erased. Thus, in the event that a user captures images which, for any reason, such user does not desire to retain, they may be erased.

In one embodiment of the invention, the captured digital data is encrypted with any suitable encryption algorithm prior to storing the captured frame data in the buffer memory. The encryption of the captured frame data assures that such data cannot be accessed without authority of the user.

The serial channel 78 is employed to download captured and stored video images to an external Personal Computer (PC), Workstation or other suitable device for viewing of the recorded images. Alternatively, the serial channel may be coupled to a radio transmitter to transmit RF signals to a base station for viewing. By way of example, upon detection of gunshots as a trigger event, and storage the specified number of frames within the circular frame buffer, the trigger event is used to cause the transmission of captured video data to a base station over an associated RF transmitter such as found in a police cruiser. The serial channel 78 may comprise a channel compliant with the well known Xmodem protocol, or any other suitable serial channel protocol, for example when the video recording device is employed in a home or another location in which AC power is employed, the serial channel may be appropriately coupled to the AC power line employing the well known X10 protocol for receipt and viewing by a device having an X10 protocol compliant receiver.

An electronic or tamper-evident mechanical seal may be optionally provided to assure that the information contained in the video recording device has not been tampered with prior to viewing to assure the evidentiary integrity of the captured images. The electronic seal may comprise encryption of the video data such that only an individual with authorization may view the recorded data. The mechanical tamper seal may be in the form of a paper or similar seal which is positioned on the case so to as to require rippage of the seal in the event the housing 10, 18 has been opened or if cable connections have been exposed.

The frame rate of video capture may be optionally varied so as to provide a higher frame capture rate or a lower frame capture rate upon the occurrence of a trigger event. The inclusion of an adaptive frame capture rate permits higher or lower frequency rates to be employed in particular applications in which such might be desirable. Additionally, the resolution may be varied so as to provide a different resolution in response to a trigger event. For example, upon recognition of a trigger event, the recording device may record at a higher or lower resolution than that employed prior to the trigger event. Further, an exponential change in resolution may be employed. Finally, the change in resolution may be delayed for a predetermined number of frames following the trigger event.

Figure 6:
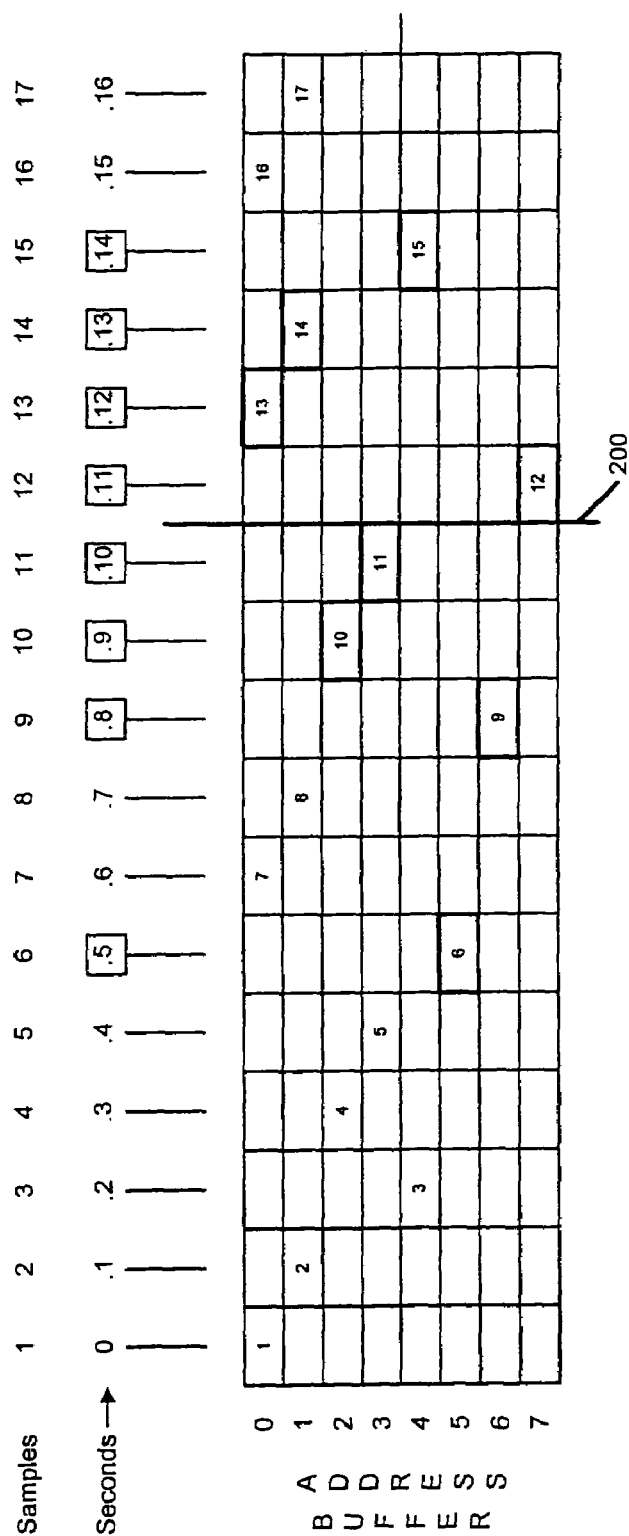
FIG. 6 is a table illustrating one storage technique for storage of video data in the semiconductor memory buffer.
Figure 7:
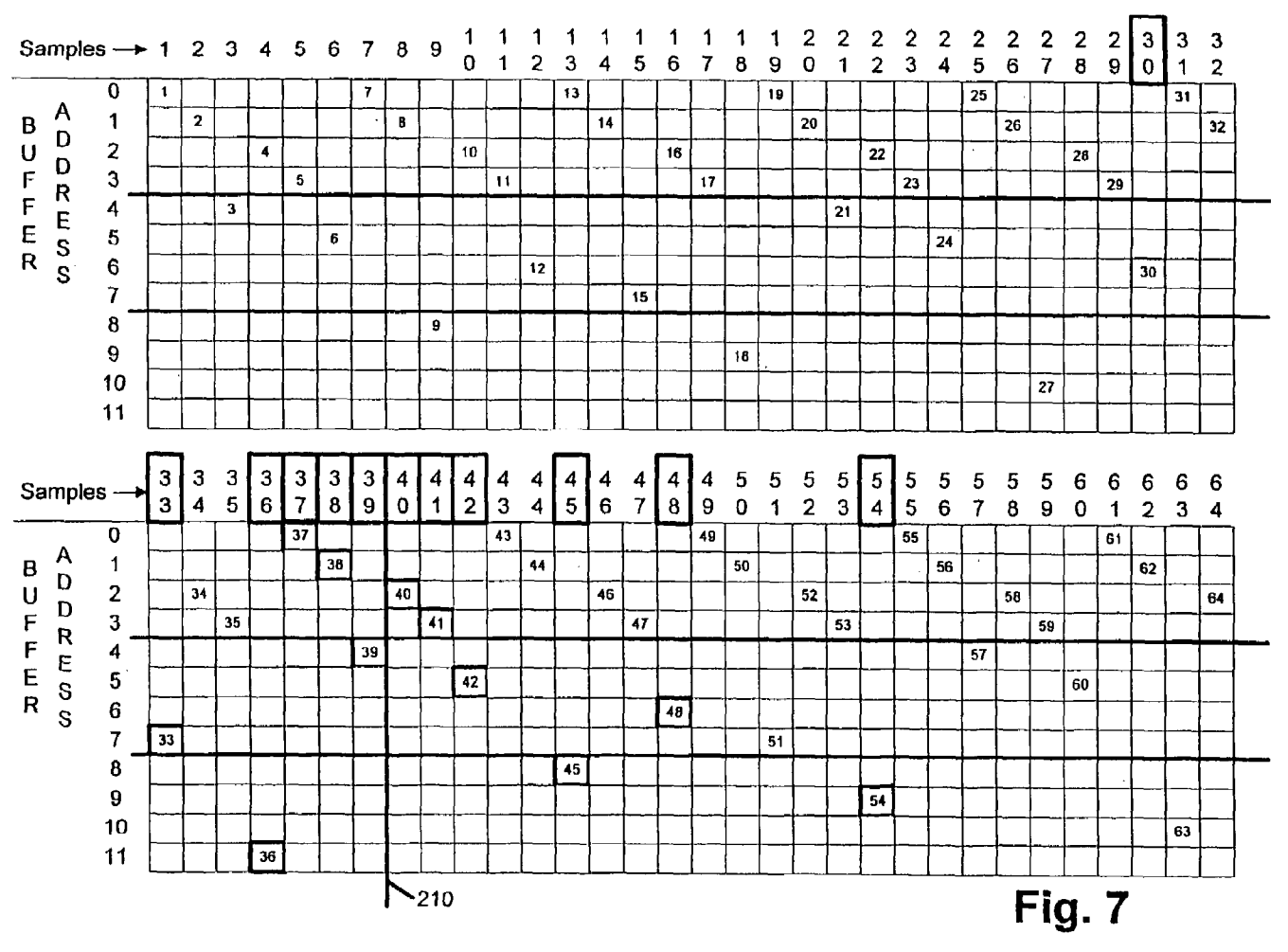
Figure 8:
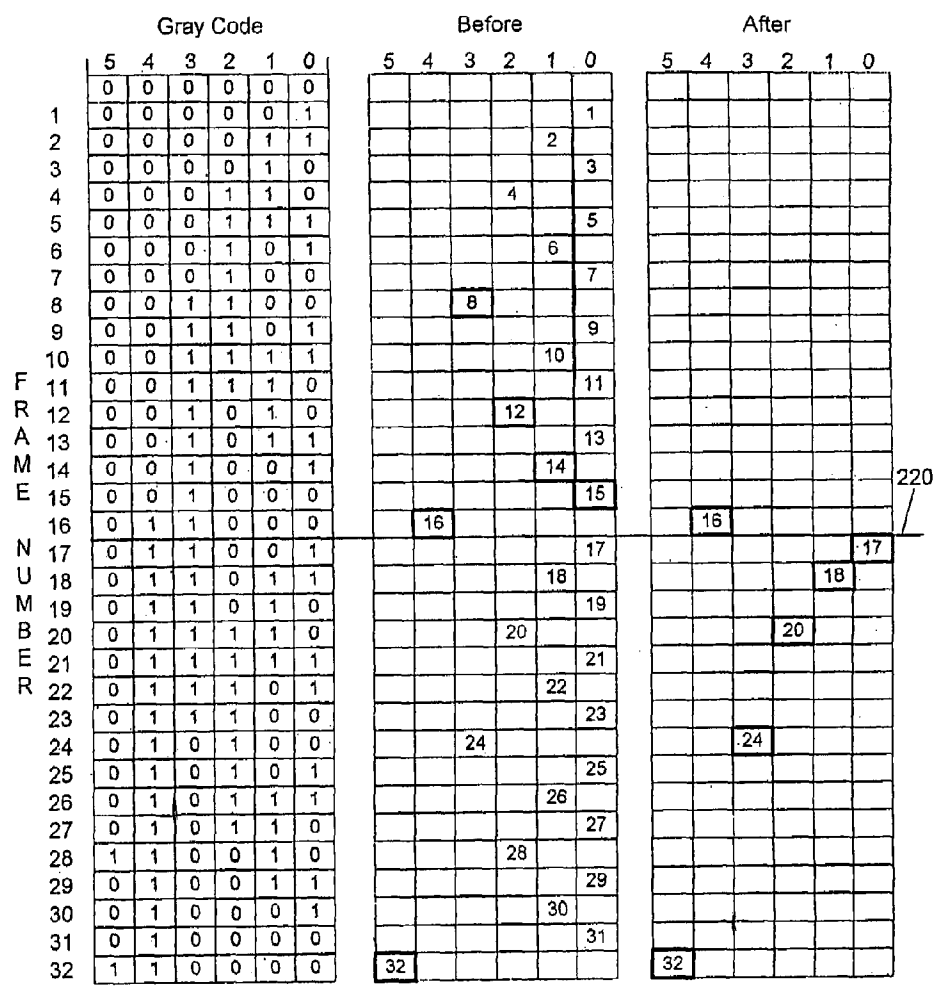

For example, video data may be stored in the memory buffer using different storage techniques to achieve desired objectives. It may be desired to have higher frame storage rates around the trigger event with successively lower effective storage rates as one progresses further in time away from the trigger event (both before and after the event). It is appreciated that any number of storage methods may be employed via selective addressing of the semiconductor memory to extend the period of time captured within the semiconductor memory buffer, or to achieve almost any frame capture profile that may be desired. Several storage techniques illustrated in FIGS. 6 through 8 are discussed below.

An automatic gain control (AGC) (not shown) may optionally be electronically coupled between the video image sensor 46 and the A/D converter 50 to compensate for variations in light intensity and to prevent blooming of the captured video image.

Figure 5:
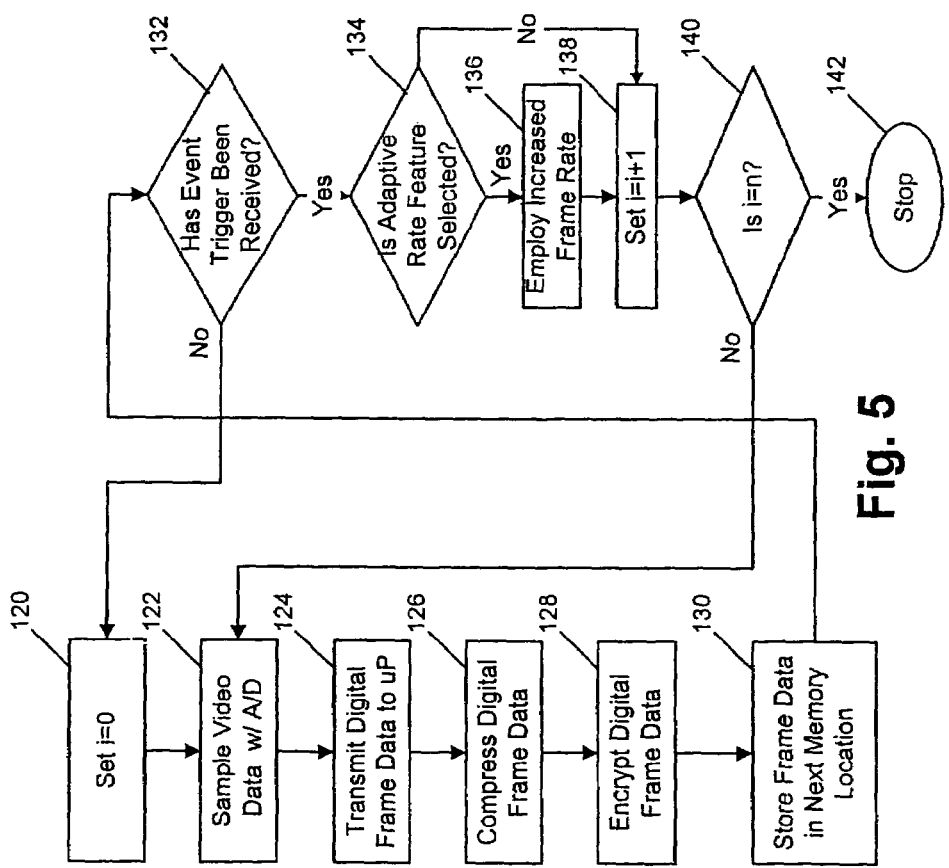
FIG. 5 is a flowchart illustrating the recording method in accordance with the present invention.

The basic method of operation of the video recording device illustrated in the block diagram of FIG. 3 and described above is illustrated in the flow diagram depicted in FIG. 5. As depicted in step 120 in FIG. 5, upon initialization, a counter value i is initialized to 0. As illustrated in step 122, the video data corresponding to a video frame is sampled by the A/D converter and converted to digital data. As shown in step 124, the converted frame data is transmitted to the microprocessor. Upon receipt of the frame data, as illustrated in step 126, the microprocessor compresses the frame data so as to permit a greater number of frames to be stored within the circular buffer memory than would otherwise be possible absent such compression. Additionally, as depicted in step 128, the frame data may optionally be encrypted by the microprocessor to prevent unauthorized access to such data. As shown in step 130, the frame data is stored in the next frame location within the circular memory buffer. In the event that any video data has previously been written to the specified memory location within the circular buffer, such data is overwritten. As illustrated in decision step 132, a determination is made whether an event trigger has been received. If no event trigger is received, the counter i is reinitialized to 0 and sampling and storage of frame data continues. If the decision step 132 results in a determination that a trigger event has been received, as illustrated in decision step 134, a determination is optionally made whether adaptive rate selection is employed. In the event that adaptive rate selection is employed, the sampling rate of the A/D converter is adjusted as depicted in step 136 and the modified frame rate is employed for subsequent frame storage. In the event that adaptive rate selection is not employed or enabled, following step 132 control passes to step 138 in which the counter i is incremented. As shown in decision step 140, a determination is next made as to whether the counter is equal to the specified number of frames to be recorded subsequent to the occurrence of a trigger event. In the event that the determination reveals that the specified number of frames has not been recorded subsequent to the trigger event, control passes to step 122 and sampling continues. In the event the determination of step 140 reveals that the predetermined number of frames have been captured subsequent to the trigger event, control passes to step 142 and further frame capture ceases.

If frames are simply received and stored in successive locations of a circular buffer, it is apparent that the total record time will equal the number of frames allocated in the buffer for storage minus one times the frame sampling period. Thus, assuming a semiconductor memory which can hold 150 video frames and a ten (10) frame per second storage rate, the semiconductor memory will only be able to hold 14.9 seconds of video data. If the trigger is adjusted so as to provide for approximately one half of the frames to be recorded prior to the trigger event and one half of the frames subsequent to the trigger event, it is evident that only approximately 7.5 seconds of record time is achieved surrounding the event of interest.

FIGS. 6 through 8 illustrate several frame storage techniques which provide for storage of video information over a greater period of time than is achieved by simply storing each successive frame in a successive buffer location as discussed hereinabove wherein the entire buffer pool is treated as a single circular buffer.

The table depicted in FIG. 6 illustrates data samples received successively at 0.1 second intervals. For simplicity, eight data storage buffers having buffer addresses 0–7 are illustrated although typically many more data buffers would be employed. The data buffers are segregated into two groups of buffers with buffers having addresses 0–3 comprising a first buffer group and buffer having addresses 4–7 comprising a second buffer group. Each group is organized as a circular buffer in which a data sample is stored in the first storage location within the respective group following storage of data sample within the last storage location of the group.

A data sample is stored in the next location within the second group following storage of a predetermined number of data samples within the first group of storage buffers.

In normal operation and in the absence of the occurrence of a trigger event samples are stored as illustrated in FIG. 6. More specifically, the first sample is stored in address 0 of the first group of buffers and the second sample is stored in address 1 of the first group of storage buffers. Following the storage of two data samples in the first group of storage buffers data sample 3 is stored in address 4 which comprises the first address in the second group of storage buffers. The next two data samples comprising samples 4 and 5 are stored in buffer addresses 2 and 3 comprising the next two successive buffer addresses within the first group of storage buffers. Sample 6 is stored in buffer address 5 which comprises the next successive buffer within the second group of storage buffers. This storage technique continues in the absence of a trigger event as illustrated for 17 data samples in FIG. 6.

Once a trigger event has been received, data storage ceases following the storage of a predetermined number of data samples ($P_n$) within each group (n) of storage buffers where n=the number of the respective buffer groups. For example, with reference to FIG. 6, a trigger event is indicated as having occurred following the receipt of data sample 11. Data storage ceases following the storage of two additional data samples in the first group of storage buffers (samples 13 and 14) and two additional samples within the second group of storage buffers (samples 12 and 15). Thus, in the simplified illustration of FIG. 6, the overall storage interval has been expanded from 0.7 seconds (8 successive samples at 0.1 second intervals) which would be obtained if all eight buffers were considered as a single buffer group to 0.9 seconds by organizing the eight buffers as two groups of buffers in which each comprises four buffers. Further, more frames are stored in the vicinity of the trigger event and fewer frames are stored for times farther away in time from the trigger event by employing the presently disclosed technique. It should further be appreciated that by employing greater numbers of groups of buffers, the time interval covered may be substantially increased while still obtaining the highest frame storage resolution immediately before and after the trigger event. Furthermore, it is possible to achieve storage of a greater number or a smaller number of frames before the trigger event or after the trigger event based upon the specification of the number of data samples that are to be stored within respective groups prior to termination of further data sample storage within the respective group.

A further example of the presently disclosed storage technique employing three groups of storage buffers, in which each group comprises four storage buffers, is illustrated in FIG. 7. As illustrated in FIG. 7, a data sample is stored in each successive group only following storage of a predetermined number of data samples within the preceding group. More specifically, the first group of storage buffers comprises buffer addresses 0 to 3, the second group of buffers comprises addresses 4 to 7 and the third group of buffers comprises buffer addresses 8 to 11. The first group of buffers comprise the highest resolution buffers since the greatest number of data samples are stored within this group. Successive groups each store fewer data samples than the preceding group. Any number of variations to the presently disclosed recording technique may be employed to obtain expansion of the time interval covered by the available number of storage buffers while maintaining high resolution recording around the trigger event. For example, while the technique illustrated in FIG. 7 provides for recording sample 9 to the first location of the third storage buffer group following storage of data samples 7 and 8 in address locations 0 and 1 respectively of the first buffer group, sample 7 could instead be stored in address 8 of the third buffer group and samples 8 and 9 could then be stored in address locations 0 and 1 of the first buffer group respectively with the storage pattern thereafter repeated in a circular manner for each of the respective buffer groups.

Referring again to the illustrated storage technique depicted in FIG. 7, a trigger event 210 is illustrated as occurring between samples 39 and 40. Subsequent to the trigger event 210, recording continues within each buffer group until the predetermined number of data samples for that group has been received and stored. In the example depicted, storage of data samples within each group ceases following receipt and storage of two data samples within each of the respective groups. There is no requirement for the number of data samples to be stored subsequent to the trigger event to be the same for each of the groups and the number of data samples stored after the trigger event may be selected so as to favor storage of information either prior to or subsequent to the trigger event for each of the storage buffer groups.

Assuming a 0.1 second sampling interval, if a single circular buffer comprising twelve buffer locations were employed without segregating buffers into groups, the interval span would constitute 1.1 seconds. In the example depicted in FIG. 7 the time span covers 2.4 seconds with only three buffer groups although the specific time span varies with the positioning of the trigger event. By increasing the number of buffer groups high resolution may still be obtained around the trigger event with even greater overall time interval coverage.

Another alternative technique for storing video data in the video recording device is illustrated in FIG. 8. A gray code generator, which in the exemplary embodiment comprises a six bit generator, is employed to generate a code in which only a single bit changes from each code to the next. The gray code generator may comprise a gray code counter implemented in hardware or alternatively, a conventional counter may be employed to address a look-up table which contains the respective gray codes and provides such codes as outputs. A buffer pool for storing video data is divided into two parts. One portion of the buffer pool (the Before column) is employed to stored video frames received prior to the trigger event 220 and a second portion of the buffer pool is employed to store video data received subsequent to the trigger event. In the example of FIG. 8, six buffers are illustrated in each portion of the buffer pool for purposes of discussion although in practice any number of buffers may be employed within the respective portions and typically the total buffer pool would include many more than 12 buffers to obtain a substantially increased recording time.

Video data is periodically stored on an ongoing basis in the absence of a trigger event, in the buffer address corresponding to the gray code bit which changed when last incremented. Thus, as illustrated, when the gray code changes from 000000 to 000001 video data corresponding to frame 1 is stored in buffer location 0 (of the Before column) since the change in the gray code occurred in bit 0 of the gray code. Similarly, when the gray code changes from 000100 to 001100, video frame 8 is written to buffer location 3 since the change in the gray code occurred in gray code bit 3. Due to the gray code addressing employed, the lowest address buffer is overwritten every other video frame. The higher the address of the buffer, the less frequent the overwriting of the respective buffer occurs. Following the storage of the video frame in the last buffer location within the first buffer portion, the sequence repeats with video frame data stored in respective buffers being rewritten with new video data.

After the gray code generator has cycled through the first buffer portion a number of times, it is assumed that a trigger event 220 occurs between frame numbers 16 and 17. Once a trigger event has been received, storage of video frame data within the first portion of the buffer pool (the Before columns) ceases and video frames then stored in the second portion of the buffer pool (the After columns) using the same addressing technique described with respect to the first portion. Several rules, however are applied with respect to writing of video frame data within the second portion of the buffer pool after the detection of a video event. Once a video frame is written to a buffer within the second portion of the buffer pool all further writes to that buffer are suppressed. Additionally, writing of video frame data to the second portion of the buffer pool ceases when the last gray code is reached which preceded the trigger event. By way of illustration, since the trigger event was detected after gray code 011000 and before gray code 011001, attempt to write to the second buffer pool would cease following the writing (or suppression of writing, as applicable) to buffer 4.

More specifically, following the trigger event 220 video frame 17 is written to buffer 0 of the second buffer pool (outlining highlighted) and video frame 18 is written to buffer 1 within the second buffer pool. Video frame 19, however, is not written to buffer 0 of the second buffer pool after the trigger event, since a video frame (frame 17) has already been written to buffer 0. Video frame 20 is written to buffer 2 (highlighted by outlining) since no prior write has occurred to buffer 2 subsequent to the trigger event 220. Writing or suppression of writing to the second buffer pool continues, as illustrated within the second buffer pool (the After columns) until the gray code is reached corresponding to the gray code immediately preceding the trigger event. In the foregoing manner the video data preceding and subsequent to the trigger event is stored for subsequent retrieval and display.

Thus, following the trigger event, and after termination of recording in the second buffer pool, frames 32, 8, 12, 14, 15 and 16 would be preserved within buffers 5, 3, 2, 1, 0 and 16 respectively of the first portion of the buffer pool and frames 17, 18, 20, 24, 32 and 16 would be preserved in buffers 0, 1, 2, 3, 5 and 4 respectively of the second portion of the buffer pool. The video frame preserved via the present storage technique in the first and second buffer pools in the present illustrative example are highlighted in bold for purposes of identification.

The utilization of a video recording device with a gun in accordance with the present invention is illustrated in FIG. 9. The video recording device 300 is mounted below a barrel 302 of the gun 304 and configured so as to have a field of view 306 generally surrounding the line of fire or target line 308 of the gun 304. In the event a situation arises in which an officer 310 is threatened with serious injury and is required to fire his gun 304 at an individual 312, the video recording device 300 preserves a video record of the circumstances as they existed prior to and after the discharge of the gun 304. More specifically, the video recording device 300 includes a sensor, which is responsive to the discharge of the gun 304 to cause the video recording device 300 to continue to record for a brief interval following the discharge of the gun into a designated portion of a memory and to then preserve video frame information generated before and after the discharge of the weapon by the officer. In this manner, an evidentiary record may be generated which may be utilized in the defense of a claim that the firing of the gun by the officer was unjustified or involved excessive force.

The application of the video recording device in association with a gun for the presently described purpose presents certain problems which differ from those encountered when the video recording device in employed in a vehicle or on a bicycle as described above. First, the triggering event comprises the firing of the gun. Since it is undesirable to provide an electronic interface to the gun, an indirect form of actuation is required to generate a triggering signal. Second, since the use of the video recording device in conjunction with a gun requires portable operation, the device must be battery powered. Accordingly, it is desirable to minimize the drain on the battery to prolong the battery life. Additionally, unlike the above described applications in which a single triggering event is involved (such as a crash), a gun may be fired a number of times and it is desirable to maintain a video record for each discharge of the gun. For the presently described application, it may be beneficial to have greater resolution associated with the first discharge of the gun since the record preceding that event is likely to define whether the shooting was justified. Finally, in view of the fact that the video images preserved by the video recording device are intended for evidentiary purposes, it is important to assure the integrity of the video data within the recording device.

Certain changes from the above described embodiment are discussed below which permit the recording device to be employed in the presently described application.

The video recording device 300 is depicted mounted below the barrel 302 of the gun 304 in FIGS. 10a and 10b. The video recording device 300 may be mounted below the barrel 302 of the gun via a clamp which extends around the barrel of the gun, may be attached to the barrel of the gun via a bracket, dovetail mount, or via any other suitable mounting technique. The device 300 is contained within a housing made of a lightweight material, such as a plastic or metal, which contains the optics, electronics, gun discharge sensor and one or more batteries as will be subsequently discussed. A lens 314 is provided at the forward end of the video recording device 300 which defines the field of view for the device.

FIGS. 11 A and 11 B illustrate the video recording device 300 mounted below a laser target designator 316. As is known in the art, a laser target designator may be employed to generate a collimated beam of light which identifies the target. The beam emanates from an opening 318 in the housing of the laser target designator 316. Finally, as depicted in FIGS. 12 A. and 12 B the laser target designator and the video recording device may be combined within a single housing 320 to minimize size and weight. As depicted in FIG. 12b, an opening 322 for the laser beam is depicted as being above the lens 324 employed in the video recording device.

Figure 13:
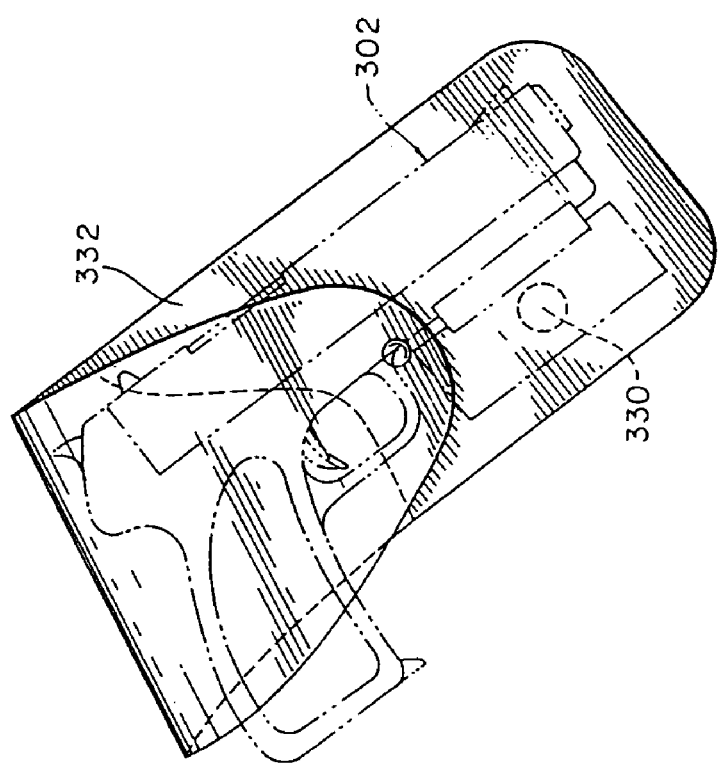
FIG. 13 is a side view illustrating the gun, laser target designator and video recording device of FIG. 10A disposed within a holster.

As a result of the fact that the video recording device is powered by the battery, it is desirable to minimize the consumption of power to prolong the useful battery life. To this end, a micro-switch, such as a magnetically actuatable reed switch, is provided in the video recording device which is oriented such that the micro-switch is adjacent to a magnet when the gun and the attached video recording device are disposed within a holster. Referring to FIG. 13, the magnet 330 is amounted to the holster 332 via any suitable means. When the gun and video recording device are disposed within the holster 332, the magnet causes the micro-switch to assume a first switch state in which the video recording device does not store video frames within the circular buffer. In the first switch state, the only power utilized by the battery is that which may be required to maintain and preserve video data which has been stored within the circular memory buffer as a consequence of the prior firing of the gun. When the gun and video recording device are removed from the holster 332, the magnet 330 is not in proximity to the micro-switch and the video recording device commences the storing of video frame data within the circular buffer memory.

Figure 14:
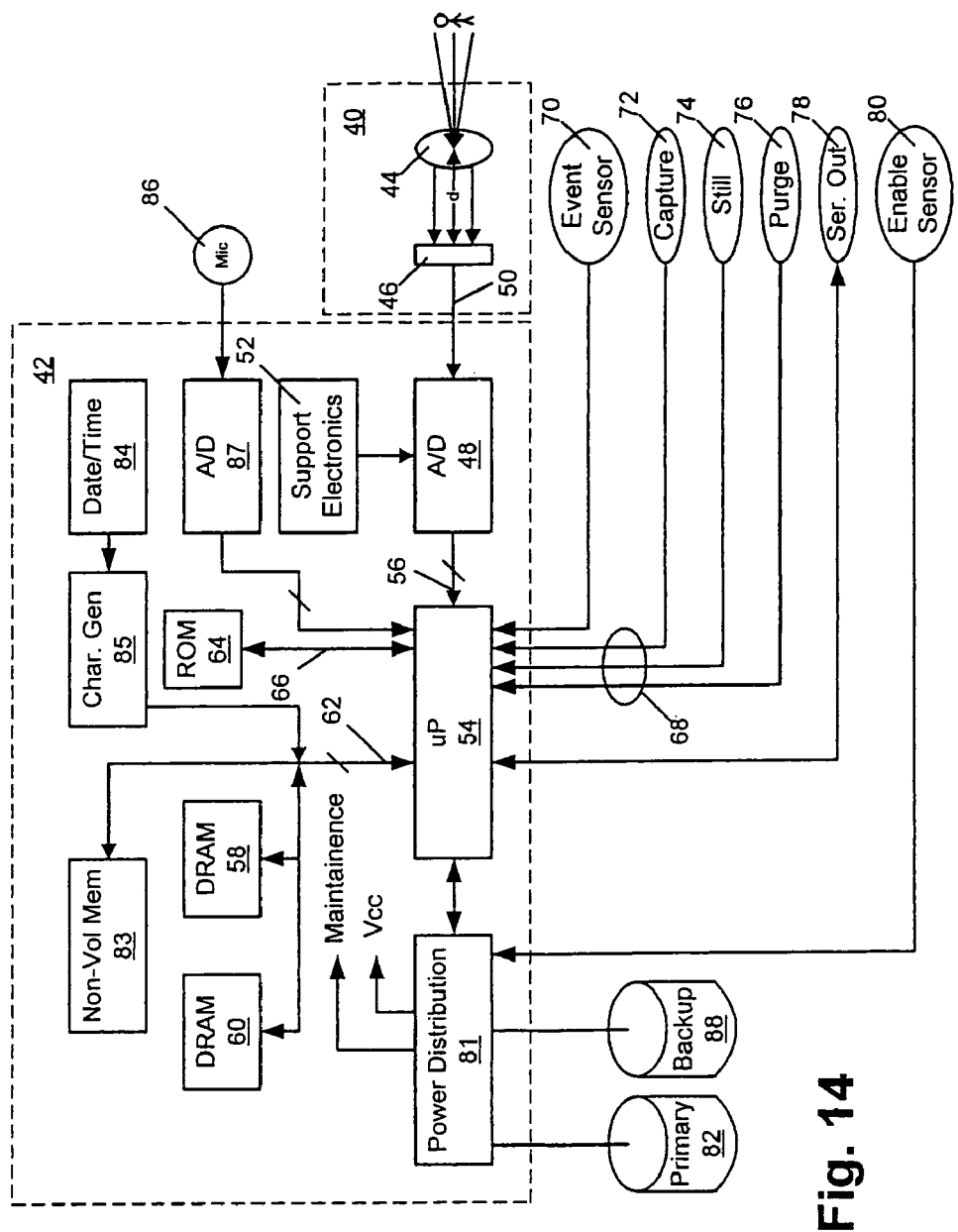
FIG. 14 is a block diagram illustrating a video recording device in accordance with the present invention for use with a gun.

A block diagram of the video recording device particularly adapted for use with a gun is depicted in FIG. 14. The operation of the recording device is generally in accord with the description provided with respect to FIG. 3 above, noting several exceptions. An enable sensor 80 is provided which is coupled to power distribution circuitry 81. The enable sensor may constitute a micro switch which assume a first state when disposed adjacent a magnet and a second state when remote from the magnet. Alternatively, the enable sensor may comprise a mechanical switch, or any other suitable sensor. When the sensor is in the first state (i.e. when the gun is in the holster and the magnet is adjacent the micro-switch) the video recording device is inactive and video frame data is not stored to the circular buffer memory. The only power that is consumed by the device when the enable sensor 80 is in the first state is that necessary to maintain previously recorded video data within the DRAM 58, 60 which requires the application of power to maintain the data and additionally, the power needed to maintain date and time data in the event such information is maintained within the recording device. In the event the video data is stored in a non-volatile memory 83 which does not require the application of power for data maintenance and date and time stamping of video frame data is not employed, no power need be consumed when the gun is in the holster and the enable sensor 80 is in the first state.

When the enable sensor is in the second state (e.g. when the gun is out of the holster and the microswitch is not adjacent a magnet) the video recording device records video frame data to the circular memory buffer as will be described subsequently in greater detail.

The enable sensor 80 is coupled to power distribution circuitry 81 which, in response to the enable sensor 80 input, distributes power to the portions of the recording device circuitry that require the application of power when the gun is disposed within the holster (video recording device is not recording) and to the portions of the recording device circuitry requiring power when the gun is removed from the holster (video recording device recording).

In the presently described application of the video recording device in conjunction with a gun, the event sensor 70 is operative to generate a trigger signal in response to the discharge of the gun. Preferably, the event sensor 70 in this application comprises an accelerometer, a microphone, or any other suitable sensor which can detect a characteristic associated with the firing of the gun indirectly (without a physical interface to the gun trigger mechanism). In the case of the accelerometer, the event sensor 70 is operative to detect the recoil of the gun to which the video recording device is mounted. In the case of a microphone, the event sensor 70 is operative to detect the sound associated with the firing of the gun. When a microphone is employed, appropriate filtering (not shown) may be required to reduce the likelihood of false triggering events due to extraneous noise (such as might result from the firing of other weapons in the vicinity). Finally, the video recording device may be interfaced directly to the trigger of the gun such that the actuation of the trigger is employed to generate a switching action or signal which is used to indicate a trigger event. Such an interface has the disadvantage of requiring the modification of the gun for use in conjunction with the video recording device.

Unlike the above described embodiment discussed with respect to FIG. 3 which is intended to generate a video record of a single event (such as an automobile crash), when the video recording device is employed in conjunction with a gun, it may be desirable to generate a video record which is associated with each firing of the gun. Moreover, it may be desirable to devote a greater percentage of the circular buffer memory to the events surrounding the initial firing of the gun since those events are more likely to bear directly on the question of whether or not the firing by the officer or individual was justified. The circular buffer memory may be subdivided evenly to accommodate a predetermined number of firings of the gun and an equal number of frames may be stored within the circular buffer memory for each firing. Alternatively, a fraction of the circular buffer memory may be devoted to the storage of data associated with the first firing. For example, one-third of the available buffer memory may be dedicated to the storage of information pertaining to the initial firing of the gun. Thereafter, another fraction of the remaining portion of the circular buffer memory may be employed for the storage of frame data pertaining to the second firing of the gun. The fraction of the circular buffer memory allocated for digital data associated with each firing may be the same or different for that employed with respect to the prior firings. For example one-fourth of the remaining portion of circular buffer memory may be employed for storage of information associated with the second firing, one fourth of the then remaining portion of the circular buffer memory may be employed for a subsequent firing, etc. until a final portion of the circular buffer memory is allocated for video data associated with the last firing event. The number of firings which may be captured depend upon the size of the circular buffer memory, whether color or black and white images are stored and the number of frames that are stored in conjunction with each firing of the gun. It is further noted that the storage techniques discussed above with respect to FIGS. 6–8 may be employed in the present application considering each portion of the circular buffer memory to be allocated to each firing of the gun as a single circular buffer memory.

Since multiple firings of the gun are possible, it is conceivable that the gun may be refired within the post trigger event time period that the video recording device is still recording as a consequence of a prior firing. In such event, the recording time may be extended so as to terminate another post event time period after the last such firing.

It is noted that while storage of video frame data terminates in the case of a single trigger event such as in the situation in which the recording device is employed to preserve a record of a car crash, in the present application, recording of data continues since a subsequent firing event may occur. To accommodate this objective, after the conclusion of data storage associated with one firing event, the head pointer 104 and the tail pointer 102 (or pointers in the event multiple buffer groups are employed as discussed above) defining the area(s) of the circular buffer memory, are stored in a table to allow later retrieval of the video data pertaining to each firing of the gun. The head and the tail pointers are then reset to allow continued recording into another portion of the circular buffer memory without overwriting the previously stored and preserved data. This process continues as each trigger event occurs until the buffer memory is full.

Since the video recording device must be portable when employed with a gun, it is important to maximize the battery life. When video frame data is preserved in DRAMs, the DRAMs must be continually refreshed to preserve the data. The drain on the battery due to memory refresh undesirably reduces the battery life. A backup battery 88 may be employed in addition to a primary battery 82 to assure that data stored in DRAMs 58, 60 is not lost during replacement of the primary battery.

To avoid ongoing battery drainage when the video recording device is not recording, a memory which is inherently non-volatile 83, such as a FLASH memory is employed for video data storage in addition to the DRAMs 58, 60. Since FLASH memories tend to have higher write currents than are desirable for the present usage, in a preferred embodiment, the video frame data is normally written to the circular buffer memory which are contained within the DRAMs 58, 60. While video frame data is being written to the circular buffer memory, the non-volatile memory 83 need not be powered. To provide fully non-volatile data storage without battery drainage, after the trigger event occurs and the video data which is to be preserved is defined, the non-volatile memory may be powered up under the control of the microprocessor 54 and the video data written from the DRAMs to the non-volatile memory 83. The non-volatile memory 83 may then be powered down to prevent undesired battery drainage while preserving the stored data. Moreover, when the gun is disposed within the holster, since preserved data is stored in the non-volatile memory 83, no need exists to power the DRAM(s). Though described above in terms of a FLASH memory, it should be appreciated that the non-volatile memory 83 may comprise a bubble memory, an EEPROM or any other memory structure which is inherently non-volatile.

Moreover, in another embodiment of the invention, in order to assure the preservation of the recorded video data, the memory 83 comprises a write once technology such as an EPROM or any other suitable non-volatile device employing a write once technology. In the event a write once memory is employed, a suitable tamper resistant lock is provided to permit removal and replacement of the memory 83 while assuring the integrity of the stored data.

Since the presently disclosed video recording device may be employed to record image data for evidentiary purposes, the device may incorporates a number of features to assure the integrity of the stored data. For example, the video recording device may include a mechanism to indicate whether the video recording device has been heated to a temperature sufficiently high to destroy the recorded data. In one embodiment, a piece of plastic material 301 (see FIG. 10*a*) having a melting point below the temperature at which stored data would be lost is mounted to the housing 300, 320. In the event the plastic material is found to have deformed, such indicates that the video recording device has been subjected to an elevated temperature and that the integrity of the data is questionable.

Furthermore, the video recording device may be provided in a waterproof housing to prevent water from causing damage to the electronics within the video recording device and a consequent loss of data.

In one embodiment, stored data may only be read from the applicable memory via an individual possessing an authorization code. More specifically, each device is either assigned a code which is hard wired into the video recording device, or alternatively, a password code is stored in a non-volatile memory within the device. The microprocessor or controller 54 only allows reading of video data via the bidirectional serial output port 78 and erasure of data associated with a firing event upon entry of a read command accompanied by an appropriate password. The data may be read out of the memory or cleared using any suitable serial data protocol in response to an authorized request. In this manner, the authenticity of the stored data can be assured.

Additionally, referring to FIG. 14, a date/time clock 84 may be incorporated within the video recording device 42. The output of the date/time clock 84 is coupled to a character generator 85 which overlays time and date information on the digital frame data stored within the applicable memory. In this manner, each frame may be time and date stamped to indicate the precise timing of the gun firing and, more specifically, the time of recording of each frame associated with such firing.

Moreover, a record may be maintained of each date and time that the gun is removed from or inserted into the holster. More specifically, in response to the removal of the gun from or the insertion of the gun into the holster, the enable sensor 80 is operative to cause the generation of a signal indicative of such removal or insertion respectively. The microprocessor 54, upon sensing such removal or insertion, may read the date/time clock and store the date/time information in a portion of the applicable non-volatile memory along with an indication of whether the gun was removed from or inserted into the holster.

An illumiation source (not shown), such as a infra-red illumination source may be activated via the enable sensor to provide additional illumination within the viewing area for low light level recording situations. The illumination source may be activated by the enable sensor alone or alternatively, in conjunction with light detection circuitry which monitors the available ambient light via a light sensor and activates the illumination source only if the need for additional light exists.

In a video recording device adapted for use with a weapon, the purge control 76, the still control 74 and/or the capture control 72 may be omitted or protected by a keylock or software password to provide the ability to preserve the evidentiary integrity or recorded data.

Finally, an audio track may be recorded to capture audio data around the time of the gun firing. The output of a microphone 86 is coupled to an A/D converter. The microphone output signal (or a buffered version thereof) is sampled periodically and the sampled data is stored within a specified portion of the DRAM or non-volatile memory, as applicable. Any suitable sampling rate may be employed. For example, a 10 kilohertz sampling rate may be utilized employing an 8 bit D/A convertor. Data may be stored using a non-linear scalar quantization technique as is known in the art to extend the dynamic range of the audio data.

While the above described data storage techniques have been applied to the specific application of video data storage, it is appreciated that these described storage techniques are equally applicable to any application in which it is desired to store data received both before and after a trigger event wherein the timing of the trigger event is indeterminate.

The foregoing video recording device thus provides for the capture and recording of video images occurring both before and after a triggering event in a compact low cost assembly which employs no moving parts such as typically employed in prior art recording devices. It should be understood that modifications to the video recording device and the methods for recording herein described will be apparent to those of ordinary skill in the art without departing from the inventive concepts contained herein. Accordingly, the invention is not to be viewed as limited except by the scope and spirit of the appended claims.

The invention claimed is:

1. A method for recording data in response to a discharge of a weapon along a target line, comprising:
    sensing at least one discharge of said weapon with a weapon discharge sensor and in response to each of the at least one discharge of said weapon, generating a weapon discharge sensor output signal;
    repeatedly storing video image data comprising video frames within a semiconductor memory within a video recording device mounted to said weapon;
    in response to the detection of each said weapon discharge sensor output signal, preserving in said semiconductor memory within said video recording device, video image data corresponding generally to an area surrounding said target line and corresponding to at least one frame stored within said semiconductor memory prior to the respective discharge sensor output signal and at least one frame stored within said semiconductor memory subsequent to the respective discharge sensor output signal.

2. The method of claim 1 wherein said weapon comprises a gun.

3. The method of claim 1 wherein said sensing further comprises sensing the at least one discharge of said weapon with an accelerometer.

4. The method of claim 1 wherein said sensing further comprises sensing the at least one discharge of said weapon with a microphone.

5. The method of claim 1 wherein said weapon includes a trigger operative to activate a switch and said sensing further comprises sensing each of the at least one discharge of said weapon upon the sensing of a change of state of said switch.

6. The method of claim 1 wherein said repeatedly storing video image data comprising video frames within said semiconductor memory comprises storing said video frames within said semiconductor memory periodically.

7. The method of claim 1 wherein:
    said storing comprises storing said video image data associated with each of the at least one discharge of said weapon in a portion of the semiconductor memory assigned for the respective discharge; and
    said preserving comprises preserving selected video image data associated with each of the at least one discharge of said weapon.

8. The method of claim 7 wherein said portion of said semiconductor memory assigned for the storage of video data associated with each successive discharge of said weapon is smaller than the portion associated with the prior discharge of said weapon.

9. The method of claim 1 further comprising:
    generating an audio signal with a microphone electrically coupled to said video recording device, wherein said audio signal is representative of sound within the vicinity of said weapon;
    sampling said audio signal with an analog to digital converter to produce digital data comprising a digital representation of said audio signal; and
    storing within said semiconductor memory at least some of said digital data extending temporally around each discharge of said weapon.

10. The method of claim 9 further comprising storing said digital data within said semiconductor memory employing a nonlinear quantization technique for the representation of said digital data.

11. The method of claim 1 further comprising:
    generating a signal with a holster state sensor having a first state when said weapon is within a holster and a second state when said weapon is not within said holster; and storing said video image data within said semiconductor memory only when said holster state sensor signal indicates that the holster state sensor is in said second state.

12. The method of claim 1 further comprising:
in response to each weapon discharge sensor output signal, reading selected video image data from said semiconductor memory and writing said selected video image data to a nonvolatile semiconductor memory.

13. The method of claim 12 further comprising:
preserving within said nonvolatile semiconductor memory, said stored video image data at least until said video image data is read from said nonvolatile semiconductor memory in response to a request from a user presenting a valid password to said video recording device.

14. The method of claim 1 further comprising storing date and time information within said semiconductor memory in association with at least some of the stored video image data.

15. A data recording device for preserving data representative of video images corresponding to an area generally surrounding the target line of a weapon, comprising:
a weapon discharge sensor operative to generate a weapon discharge sensor output signal upon at least one discharge of said weapon;
at least one semiconductor memory;
a video camera operative to repeatedly generate video image data representative of said video images; and
a controller operative to cause the storage of digital data representative of said video image data within said at least one semiconductor memory at predetermined times both before and after the generation of said weapon discharge sensor output signal;
said controller being further operative to preserve selected digital data stored in said at least one semiconductor memory in response to said weapon discharge sensor output signal.

16. The data recording device of claim 15 wherein said weapon comprises a gun.

17. The data recording device of claim 15 wherein said controller is operative to preserve at least some of said digital data stored within said at least one semiconductor memory prior to generation of said weapon discharge sensor output signal and some of said digital data stored within said semiconductor memory following generation of said weapon discharge sensor output signal.

18. The data recording device of claim 15 wherein said weapon discharge sensor comprises an accelerometer mechanically coupled to said data recording device.

19. The data recording device of claim 15 wherein said weapon discharge sensor comprises a microphone.

20. The data recording device of claim 19 wherein said weapon includes a trigger and said weapon discharge sensor comprises a switch coupled to said trigger of said weapon.

21. The data recording device of claim 20 wherein said controller is operative to cause the storage of said digital data within said at least one semiconductor memory periodically.

22. The data recording device of claim 21 wherein said controller is operative to preserve digital data associated with each weapon discharge sensor output signal in a separate portion of said at least one semiconductor memory.

23. The data recording device of claim 21 wherein said at least one semiconductor memory comprises at least one dynamic random access memory and a nonvolatile memory, said controller is operative to store said digital data within said dynamic random access memory periodically and said controller is further operative in response to said weapon discharge sensor output signal to cause selected digital data stored within said dynamic random access memory to be read from said dynamic random access memory and stored within said nonvolatile memory.

24. The data recording device of claim 23 wherein said nonvolatile memory comprises at least one flash memory.

25. The data recording device of claim 23 wherein said nonvolatile memory comprises at least one bubble memory.

26. The data recording device of claim 23 wherein said nonvolatile memory comprises an electrically erasable programmable random access memory.

27. The data recording device of claim 15 wherein said at least one semiconductor memory comprises at least one dynamic random access memory.

28. The data recording device of claim 15 wherein said controller includes a bidirectional communications interface and said controller is operative in response to receipt of a read command having a specified password on said interface to transmit digital data preserved within said at least one semiconductor memory over said interface.

29. The data recording device of claim 28 wherein said bidirectional communications interface comprises a bidirectional serial interface.

30. The data recording device of claim 15 further comprising an enable sensor coupled to said controller, wherein said enable sensor is operative to produce a signal having a first state when said weapon is disposed within a holster and said enable sensor is operative to produce a signal having a second state when said weapon is not disposed within said holster, and said controller is operative to cause the storage of said digital data within said at least one semiconductor memory only when said enable sensor signal is in said second state.

31. The data recording device of claim 30 wherein said enable sensor comprises a switch.

32. The data recording device of claim 31 wherein said switch comprises a magnetically actuatable switch.

33. The data recording device of claim 32 wherein said magnetically actuatable switch comprises a magnetically actuatable reed switch.

34. The data recording device of claim 15 further comprising:
a clock operative to generate date and time information; and
a character generator operative to generate digital representations of said date and time information;
wherein said controller is operative to store at least some of said digital representations of said date and time information within said at least one semiconductor memory in association with the stored digital data.

35. A data recording device for preserving data, comprising:
a sensor configured to detect an occurrence;
a memory configured to store at least one of audio and video data such that later stored data is recorded over previously stored data;
a nonvolatile memory; and
a controller configured to transfer the data stored in the memory to the nonvolatile memory based on the detection of the occurrence by the sensor;
wherein the transferred data corresponds to a period of time beginning prior to the detection of the occurrence by the sensor and ending subsequent to the detection of the occurrence by the sensor.

36. The data recording device of claim 35, wherein:
the occurrence is a first occurrence and the period of time is a first period of time;
the sensor is further configured to detect a second occurrence; and
the controller is further configured to transfer the data stored in the memory which corresponds to a second period of time beginning prior to the detection of the second occurrence by the sensor and ending subsequent to the detection of the second occurrence by the sensor to the nonvolatile memory based on the detection of the second occurrence by the sensor.

37. The data recording device of claim 35, further comprising:
a portable housing having the sensor, the memory, the nonvolatile memory, and the controller disposed therein.

38. The data recording device of claim 35, further comprising:
a weapon;
wherein the occurrence is the firing of the weapon.

* * * * *